Nov. 24, 1931.   F. PFAUS ET AL   1,833,792
SPECTACLE FRAME
Original Filed March 3, 1928
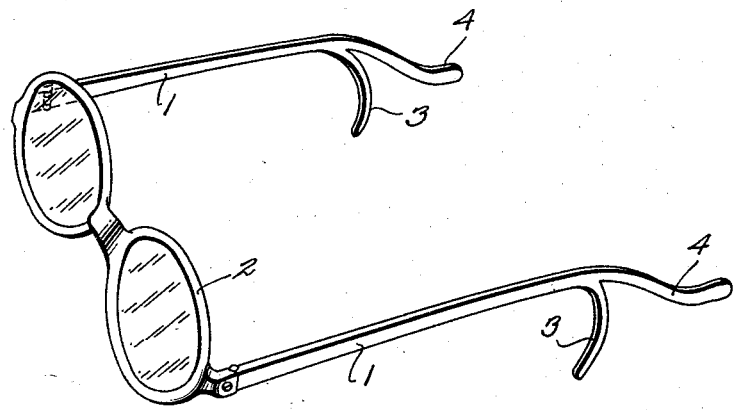
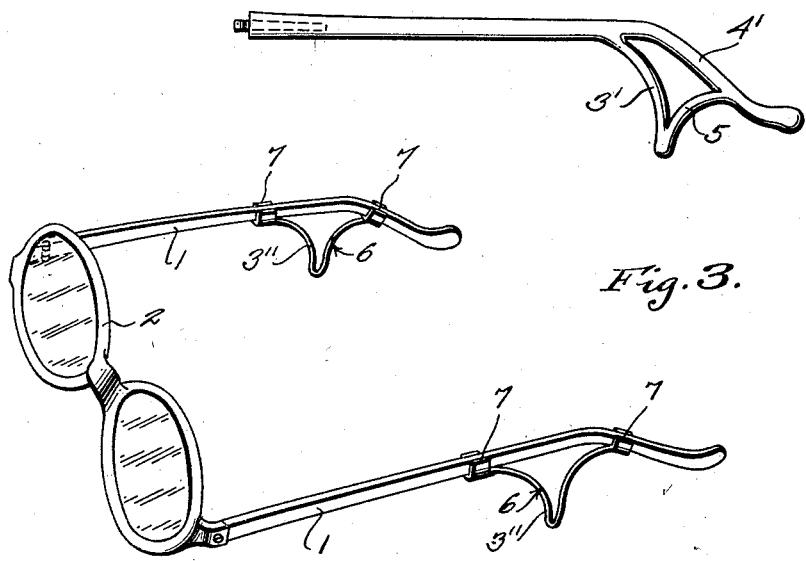
Fred Pfaus
R St.P.Smith
INVENTORS Patented Nov. 24, 1931

1,833,792

UNITED STATES PATENT OFFICE

FRED PFAUS AND ROBERT ST. PATRICK SMITH, OF RICHMOND, VIRGINIA

SPECTACLE FRAME

Application filed March 3, 1928, Serial No. 258,930. Renewed August 28, 1931.

This invention relates to a spectacle frame, the general object of the invention being to provide the temple members thereof with curved depending portions for engaging the ears of the wearer so as to hold the spectacles firmly in place and prevent slipping of the frame on the nose.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a perspective view of one form of the invention.

Figure 2 is a side view showing a modification.

Figure 3 is a perspective view showing another modification.

As shown in Figure 1, each temple piece 1 of the frame 2 is formed with a curved depending piece 3 adjacent its free end which is adapted to hook over an ear of the user. These curved pieces act to hold the glasses in proper position and prevent the frame from slipping forwardly on the nose of the wearer. The depending pieces also increase the area of the head engaging portion of the temple pieces and help the end pieces 4 to hold the glasses firmly in place.

In the modification shown in Figure 2, a brace piece 5 connects the extremity of each curved piece 3′ with the part 4′ so that the extremity of each temple piece is reinforced and this piece 5 also facilitates the placing of the temple members against the head and their removal therefrom, particularly where the glasses are worn by women, as there is less chance of the parts becoming entangled in the hair.

In the modification shown in Figure 3, the ear engaging parts 3″ are adjustably and removably connected with the temple members, as each piece is formed of a strip of wire or the like, as indicated at 6, which is of substantially V-shape with a clamp 7 attached to each end thereof, these clamps engaging the temple member, as clearly shown in Figure 3. Thus the ear engaging pieces can be adjusted on the temple members and they can be used on glasses as now constructed.

It is thought from the foregoing description that the advantages and novel features of our invention will be readily apparent.

It is to be understood that we may make changes in the construction and in the combination and arrangement of the several parts, provided that such changes fall within the scope of the appended claim.

What we claim is:—

A spectacle frame comprising a pair of temple members each having a downwardly curved extremity and a curved depending member formed integrally with each temple member and spaced from said curved extremity whereby said curved members will engage the ears of the user and the curved extremities will extend rearwardly of the ears, and a brace piece connecting the lower end of each ear engaging member with a temple member and formed integrally with the temple member and the ear engaging member.

In testimony whereof we affix our signatures.

FRED PFAUS.
ROBERT ST. PATRICK SMITH.